Patented Sept. 12, 1922.

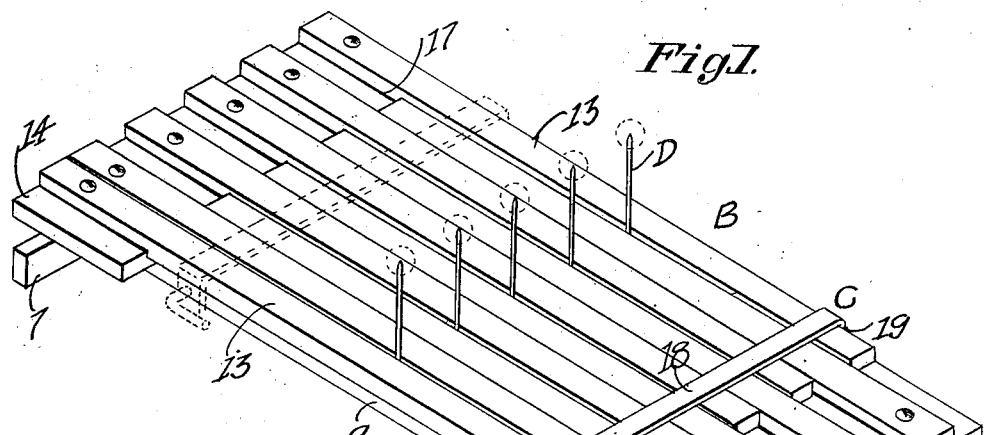
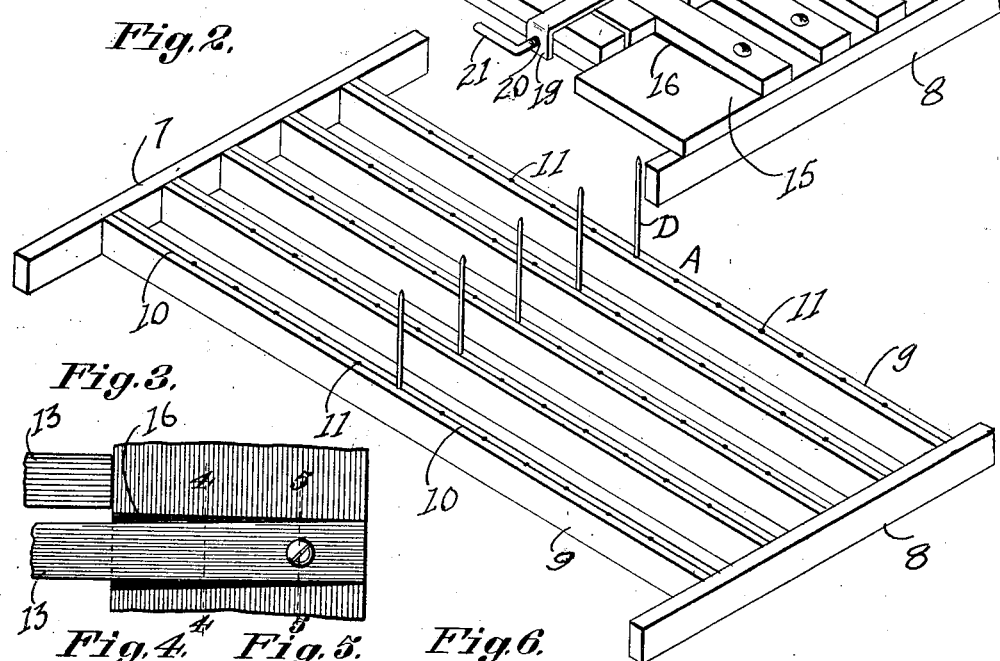

1,428,872

UNITED STATES PATENT OFFICE.

ISAAC ANDERSON, OF OAKLAND, CALIFORNIA.

CANDY-DIPPING DEVICE.

Application filed April 22, 1921. Serial No. 463,524.

*To all whom it may concern:*

Be it known that I, ISAAC ANDERSON, a citizen of the United States, residing at Oakland, in the county of Alameda and State of California, have invented new and useful Improvements in Candy-Dipping Devices, of which the following is a specification.

This invention relates to a dipping apparatus and has particular reference to a candy forming device whereby a plurality of sticks supported in a frame are extracted therefrom as a unit by positive gripping means and then subjected to a dipping operation in order to either accumulate on the sticks candy to thereby produce types of candies known as "suckers" or to coat the candy already on the sticks to thereby produce a finished candied article.

The principal object of this invention is to provide means for easily and positively extracting the sticks to be dipped, and means for retaining the sticks in a fixed position during the dipping action.

A further object of this invention is to provide a device of the character described which is simple in construction, positive in action, economical to manufacture and a device which can be easily assembled and disassembled.

Other objects and advantages will be apparent during the course of the following description.

In the accompanying drawings forming a part of this specification and in which like numerals are employed to designate like parts throughout the same, Fig. 1 is a perspective view of the device showing a dipping frame positioned on a stick supporting frame, Fig. 2 is a perspective view of the stick supporting frame, Fig. 3 is a fragmentary plan view of the dipping frame, showing the relative position of the extracting strips prior to the tightening action of a clamping element, forming part of my invention, Fig. 4 is a sectional view through the assembled frames, taken on a line 4—4 of Fig. 3, Fig. 5 is a similar view taken on the line 5—5 of Fig. 3, and Fig. 6 is a sectional detail of the parallel interlocking extracting strips of the dipping frame super-imposed upon one of the split bars of the supporting frame, with one of the sticks in position prior to the dipping action.

In the accompanying drawings wherein for the purpose of illustration is shown a preferred embodiment of my invention, the device comprises a supporting frame, "A" an extracting or dipping frame "B", a clamping element "C" and sticks "D," which form part of the sucker construction. Referring specifically to the supporting frame "A" as shown to advantage in Fig. 2, the same embodies in its construction end sills 7 and 8 which are connected by a plurality of cross bars or double bars 9 adapted to be longitudinally split at 10, and provided with a plurality of spaced depressions 11. In these depressions I propose to insert a plurality of sticks "D" which are to be removed as a unit by the extracting wedge shaped strips 13, from the frame "B" prior to the dipping of the sticks in a vat (not shown) containing either candy or a coating solution.

The frame "B" embodies in its construction end members 14 and 15, each of which is provided with recesses 16 and 17 to allow for the lateral play of the extracting strips 13, which are pivoted at their outer extremities to the respective end members 14 and 15. The construction of the recesses and pivoted strips is shown to advantage in Figs. 3 and 5, while in Fig. 4, I have shown one of the grooves formed in one of the end members to more clearly illustrate the position of a pair of strips before the clamping element "C" is applied, the tightening action of which forces the said strips into closer relation to each other.

The above referred to clamping element comprises a main body portion 18 provided with integrally formed depending lips 19 in which there are provided threaded opening 20 adapted to be penetrated by a screw element 21 for the purpose of forcing the strips closer together after they are assembled in an interlocking position as shown to advantage in Fig. 1.

For the purpose of illustration I have shown in dotted lines in Figs. 1 and 6 material, such as balls of candy, which is gathered on the sticks when the dipping frame is inverted and positioned over a vat or suitable receptacle which holds the candy in its liquid or congealed state. On the other hand when the device is to be used as a coating device the balls of candy are already present on the sticks when the frames are assembled as shown in Fig. 1 and the device is then inverted and positioned over the vat or suitable receptacle which holds the coating solution.

In the use of my device the plurality of the sticks "E," which are adapted to collect the candy thereon, are first inserted in the depressions 11 of the split bars 9 which form a part of the supporting frame, "A." The dipping frame "B" is next positioned above the supporting frame "A" in such a manner that the end members 14 and 15 rest on the sills 7 and 8 respectively. By virtue of this arrangement the strips 13 of the respective end members interlock and are so positioned with relation to each other that the sticks "D" extend between and protrude through the same, this construction being shown to advantage in Fig. 1.

After this step has been accomplished, the clamping element "C" is actuated and a consequent tightening of the screw element 21 causes the strips to move in closer proximity to the sticks "D" to thus firmly grip the same. The dipping frame "B" is then manually removed as a unit, next inverted and either positioned above or rested upon the edge of the candy vat before referred to. The candy in the vat will then form on the ends of the sticks and congeal thereon. When this step has been accomplished the frame "B" is removed intact from its position on the vat and by the removal of the clamping element the formed suckers are allowed to drop upon a suitable receiving table. The above mentioned operation is then repeated for the purpose of forming a new lot of suckers, or for coating the candy accumulated on the sticks.

From the detailed description of my invention it will be apparent that I have set forth a device that will fulfill a long needed want in the candy trade, and a device which will accomplish the formation of a great quantity of the articles referred to in a minimum amount of time and with small effort on the part of the operator.

It is understood that the form of my invention herewith shown and described, is to be taken as a preferred example of the same, and that various changes in the shape, size and arrangement of parts may be resorted to without departing from the spirit of the invention or the scope of the subjoined claims.

Having thus described my invention, I claim:—

1. A device of the character described comprising, a supporting frame for holding a plurality of sticks to be dipped, said frame including end sills and spaced connecting split bars having depressions for receiving therein the sticks to be dipped, a dipping frame including interlocking strips and adapted to be positioned on said supporting frame, and clamping means secured on said last mentioned frame whereby the sticks positioned in said supporting frame are withdrawn therefrom, for the purpose specified.

2. A device of the character described comprising, a supporting frame for holding a plurality of sticks to be dipped, a dipping frame including grooved end members having pivoted thereon interlocking strips, and clamping means secured on said last mentioned frame, whereby the sticks positioned in said supporting frame are withdrawn therefrom, for the purpose specified.

3. A device of the character described comprising, a supporting frame for holding a plurality of sticks to be dipped, a dipping frame including wedge shaped interlocking strips and adapted to be positioned on said supporting frame, clamping means secured on said last mentioned frame whereby the sticks positioned in said supporting frame are withdrawn therefrom, said means including a main body portion having apertured depending lips adapted to contact with the end strips of said frame, and a screw element for forcing a plurality of strips in close proximity to each other, for the purpose specified.

4. A device of the character described comprising, a supporting frame for holding a plurality of sticks, said frame including end sills and spaced connecting split bars having depressions for receiving therein the sticks to be dipped, a dipper frame including grooved end members adapted to have pivoted thereon tapered interlocking strips, said dipper frame being positioned on said supporting frame, a clamping means secured on said dipping frame, whereby the sticks positioned in said supporting frame are withdrawn therefrom, said means including a main body portion having depending apertured lips adapted to contact with the end strips of said frame, and a screw element for forcing the plurality of sticks in close proximity to each other, for the purpose specified.

In testimony whereof I affix my signature.

ISAAC ANDERSON.